United States Patent [19]

Katz et al.

[11] Patent Number: 5,345,528
[45] Date of Patent: Sep. 6, 1994

[54] METHOD FOR ENHANCING THE PULLOUT STRENGTH OF POLYMER-COATED OPTICAL FIBER

[75] Inventors: Howard Edan Katz, Summit; Valerie J. Kuck, Upper Montclair; Marcia L. Schilling, Basking Ridge, all of N.J.

[73] Assignee: AT&T Bell Laboratories, Murray Hill, N.J.

[21] Appl. No.: 98,972

[22] Filed: Jul. 28, 1993

[51] Int. Cl.⁵ ............................................. G02B 6/10
[52] U.S. Cl. ................................. 385/123; 385/100; 385/102; 385/128
[58] Field of Search ............... 385/100, 102, 123, 126, 385/127, 128, 141, 142, 145

[56] References Cited

U.S. PATENT DOCUMENTS 5,104,433  4/1992  Chapin et al. .................. 65/3.1
5,146,531  9/1992  Shustack ........................ 385/128

FOREIGN PATENT DOCUMENTS

WO91/03503  3/1991  .

*Primary Examiner*—Frank Gonzalez
*Attorney, Agent, or Firm*—Glen E. Books

[57] ABSTRACT

Applicants have discovered that by heating cured polymer-coated fiber at temperatures of 100° C. or more, they can enhance the fiber pullout strength by 25% or more. This postcure heating can advantageously be done off-line by placing loosely wound fiber in a heated oven. Alternatively the postcure heating can be done on-line by reel-to-reel passage of the fiber through a heated furnace. Preferred temperatures are in the range 100° C.–300° C.

6 Claims, 1 Drawing Sheet

METHOD FOR ENHANCING THE PULLOUT STRENGTH OF POLYMER-COATED OPTICAL FIBER

FIELD OF THE INVENTION

The present invention relates to methods for making optical fiber and, in particular, to a method for making polymer-coated optical fiber having enhanced pullout strength.

BACKGROUND OF THE INVENTION

Optical fibers are key components in modern telecommunications systems. Optical fibers are thin strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical optical fibers are made of high-purity silica with minor concentrations of dopants to control the index of refraction.

Commercial optical fibers are provided with polymer coatings to protect them from mechanical abrasion and stress. Typical polymers are urethane-acrylate coatings. The coatings are typically applied and cured with ultraviolet light as the fiber is drawn in a continuous process.

It is commercially desired that the polymer coating adhere to the fiber yet, when the need arises, permit visually clean stripping for splicing with other fibers and interconnecting with photonic devices. The accepted test of fiber-coating adhesion is the pullout test which measures the force needed to slide out one centimeter of fiber from its polymer coating.

SUMMARY OF THE INVENTION

Applicants have discovered that by heating cured polymer-coated fiber at temperatures of 100° C. or more, they can enhance the fiber pullout strength by 25% or more. This postcure heating can advantageously be done off-line by placing loosely wound fiber in a heated oven. Alternatively the postcure heating can be done on-line by reel-to-reel passage of the fiber through a heated furnace. Preferred temperatures are in the range 100° C.-300° C.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for the graph, are not to scale.

DETAILED DESCRIPTION

Figure 1:
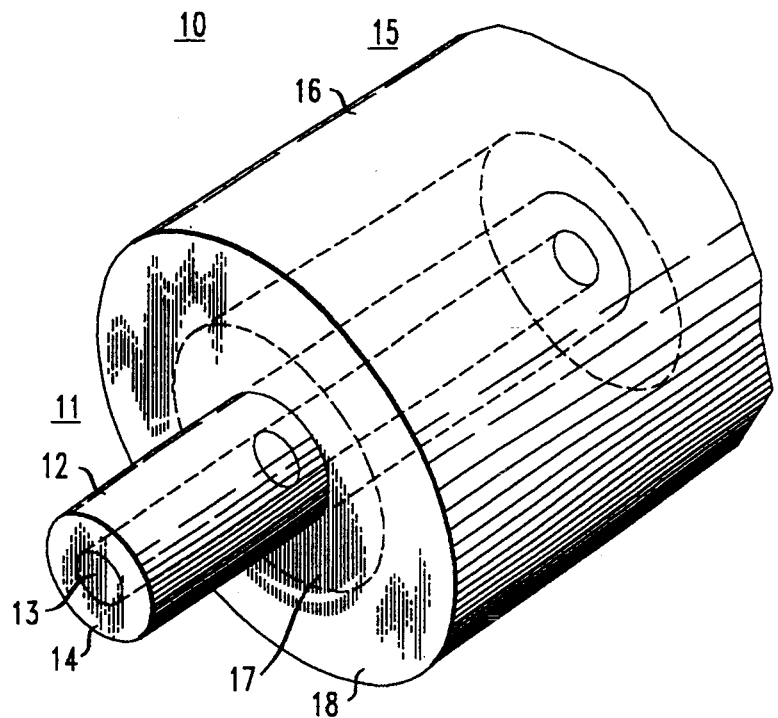
FIG. 1 is a schematic view of a typical cured, polymer-coated optical fiber which can be processed in accordance with the invention.

The first step in the inventive method is to provide a cured, polymer-coated optical fiber. FIG. 1 of the drawings is a schematic view of a typical coated fiber 10 shown with a stripped end 11 comprising a glass fiber 12 including a core region 13 surrounded by a cladding region 14. The fiber can be single mode or multimode optical fiber, but is preferably a single mode silica fiber having a core diameter on the order of a few micrometers and a surrounding cladding a few tens of micrometers thick. Desirably the outer surface of the stripped fiber 12 should be free of visible polymer residues.

The unstripped fiber 15 comprises a cured polymer coating 16 which is preferably a dual coating comprising a primary (inner) coating 17 and a secondary (outer) coating 18. The polymer coatings can be any one of a variety of polymers including hydrocarbon polymers, polyethers, polycarbonates, polyesters and silicones. The primary coating is advantageously formulated to provide a soft, rubbery texture whereas the secondary coating advantageously has a more highly crosslinked, glassy texture. The polymers are preferably terminated by urethane-acrylates. Coatings comprising hydrocarbon polymers terminated with urethane acryltes are described in U.S. Pat. No. 5,146,531 entitled Ultraviolet Radiation Curable Coatings for Optical Fibers and Optical Fibers Coated Therewith issued to Paul J. Shustack on Sep. 8, 1992. Coatings comprising polycarbonate polymers terminated with urethane-acrylates are described in International Application WO91/03503 published under the Patent Cooperation Treaty on Mar. 21, 1991 and entitled "Primary Coating Composition for Optical Glass Fibers".

Cured, polymer-coated optical fibers are typically manufactured by constructing an optical fiber preform of desired composition, drawing fiber from the preform, and passing the fiber through baths of uncured polymer. The polymer is typically cured by exposure to ultraviolet radiation. Unfortunately the pullout strength of such fiber is not sufficient to satisfy some customers.

Applicants have discovered that the pullout strength of such cured, polymer-coated fiber can be significantly enhanced by 25% or more by heating the cured fiber at temperatures of 100° C. or more for appropriate times. Moreover while this postcure heating increases the pullout strength, it does so with no substantial increase of visible polymer residues on the glass fiber after pullout. The pullout strength enhancement occurs for a wide variety of polymer coatings.

The preferred method of postcure heating is off-line heating in a forced air oven. Table 1 below compares the pullout strengths of two dual-coated fibers, unheated and heated. The coatings designated type A are polycarbonate urethane-acrylates of the type described in WO91/03503, and the coatings designated type B are hydrocarbon urethane acrylates of the type described in the aforementioned Shustack patent. Loosely coiled fibers were heated at 140° C. in a forced-air oven for the times specified.

TABLE 1

| Coating | Pullout Force (lb/cm) | | |
|---|---|---|---|
| | Unheated | Heated 10 min | Heated 100 min |
| Type A | 1.4 | 2.3 | 4.3 |
| Type B | 2.0 | 4.2 | — |

Figure 2:
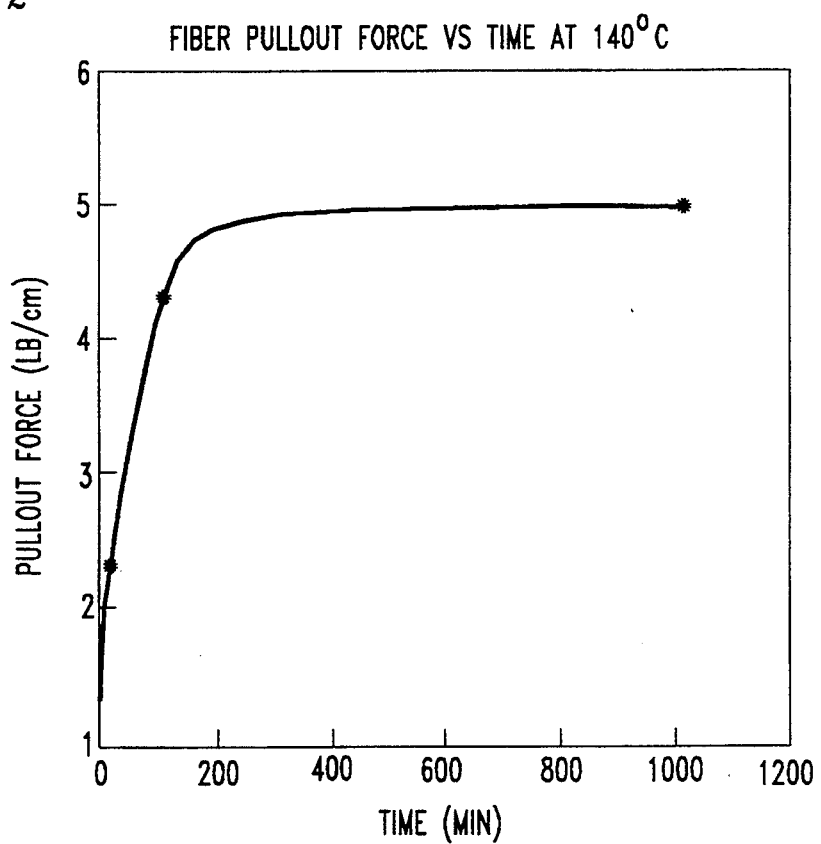
FIG. 2 is a graphical illustration showing the effect of off-line oven heating on the pullout strength of a typical fiber.

The degree of pullout strength enhancement at a given temperature is an increasing function of time. FIG. 2 is a plot of fiber pullout force versus time for a typical type A coated fiber heated at 140° C.

To determine the persistence of the heating-induced adhesion enhancement, pullout values for type B samples were measured after three days and after six weeks under 50% and 95% relative humidity. The fiber was heated for 10 minutes at 140° C. before aging. As shown in Table H, below, the improved adhesion observed after post-cure heating diminished only slightly under these conditions, indicating that the effect is not metastable and is not easily undone by absorbed water.

TABLE II

| Aging Conditions | Pullout Force (lb/cm) | |
| --- | --- | --- |
|  | Unheated | Heated |
| 1 hour after draw, 50% RH | 1.6 | 3.3 |
| 3 days after draw, 50% RH | 1.6 | 2.8 |
| 3 days after draw, 95% RH | 1.7 | 2.9 |
| 6 weeks after draw, 50% RH | 1.8 | 2.9 |
| 6 weeks after draw, 95% RH | 2.1 | 2.7 |

Alternatively postcure heating can be on-line heating by passing the cured polymer-coated fiber reel-to-reel through a quartz lined furnace. Table III below compares the pullout strengths of unheated fiber and fiber passing through a 60° furnace. Specifically, a type A coated fiber aged six months at 23° C. in 50% relative humidity was passed at constant velocity from a reel through a 40 cm tube furnace lined with a 48 mm inner diameter quartz tube. The heated fiber was cooled in a stream of nitrogen and taken up on a second reel.

TABLE III

| Condition | Pullout Force (lbs/cm) |
| --- | --- |
| Unheated | 2.3 |
| 2.4 s, 260° C. | 2.5 |
| 4.8 s, 260° C. | 2.7 |

TABLE III-continued

| Condition | Pullout Force (lbs/cm) |
| --- | --- |
| 7.2 s, 260° C. | 2.9 |
| 13 s, 260° C. | failure |

Since typical polymers decompose at temperatures above about 300° C., heating at temperatures greater than 300° C. is believed inadvisable and can lead to a discolored and weakened polymer.

Thus the cured polymer coated fiber should be heated at a temperature between 100° C. and 300° C. for a time sufficient to increase its pullout strength by at least 25%. The time required depends on the temperature. At 100° C., about 5 hours are required. At 140° C., about 50 minutes, and at 260° C., about 7s. More generally, pullout strength versus heating time was found to fit the relation $$P(t) = P_o + \Delta P(1 - e^{-t/\tau})$$

where P(t) is the pullout strength after heating for a time t, Po is the pullout value before heating, $\Delta P$ is the maximum observable increment in P and $\tau$ is an empirically determinable time constant.

We claim:

1. A method for enhancing the pullout strength of polymer-coated optical fiber comprising the steps of:
   providing a cured, polymer-coated optical fiber; and
   heating said fiber at a temperature in the range 100° C. to 300° C. for a time sufficient to increase the pullout strength by at least 25%.

2. The method of claim 1 wherein said fiber is heated off line in a heated oven.

3. The method of claim 1 wherein said fiber is heated on-line by passage through a heated furnace.

4. The method of claim 1 wherein said polymer-coated optical fiber is coated with a polymer from the group consisting of hydrocarbon polymers, polyethers, polycarbonates, polyesters and silicones.

5. The method of claim 1 wherein said polymer-coated optical fiber is coated with a polymer terminated by urethane-acrylates.

6. The method of claim 1 wherein said fiber comprises silica.

* * * * *